(12) United States Patent
Katzman (10) Patent No.: US 12,290,998 B2
(45) Date of Patent: May 6, 2025

(54) MACHINE AND METHOD FOR OBTAINING A CURVED SURFACE FOR A FILM STRUCTURE

(71) Applicants: ESSILOR INTERNATIONAL, Charenton-le-pont (FR); SHAMIR OPTICAL INDUSTRY LTD., Kibbutz Shamir (IL)

(72) Inventor: Youval Katzman, Zichron Yaakov (IL)

(73) Assignees: Essilor International, Charenton-le-Pont (FR); Shamir Optical Industry Ltd., Kibbutz Shamir (IL)

( * ) Notice: Subject to any disclaimer, the term of this patent is extended or adjusted under 35 U.S.C. 154(b) by 78 days.

(21) Appl. No.: 18/016,088

(22) PCT Filed: Jul. 13, 2021

(86) PCT No.: PCT/EP2021/069413
§ 371 (c)(1),
(2) Date: Jan. 13, 2023

(87) PCT Pub. No.: WO2022/013196
PCT Pub. Date: Jan. 20, 2022

(65) Prior Publication Data
US 2023/0271393 A1    Aug. 31, 2023

(30) Foreign Application Priority Data

Jul. 16, 2020 (EP) .................................. 20305820

(51) Int. Cl.
B29D 11/00 (2006.01)
(52) U.S. Cl.
CPC .... *B29D 11/0073* (2013.01); *B29D 11/00788* (2013.01)

(58) Field of Classification Search
CPC .......... B29D 11/0073; B29D 11/00788; B29C 51/14; B29C 51/26; B29C 51/262;
(Continued)

(56) References Cited

U.S. PATENT DOCUMENTS

| 2,367,642 A | 1/1945 | Helwig |
| 2,367,779 A | 1/1945 | Hul |

(Continued)

FOREIGN PATENT DOCUMENTS

| EP | 0448324 | 9/1991 |
| EP | 2026950 | 2/2009 |

(Continued)

OTHER PUBLICATIONS

Extended European Search Report in corresponding EP Application No. 20305820.1, dated Dec. 21, 2020.

(Continued)

*Primary Examiner* — George R Koch
(74) *Attorney, Agent, or Firm* — Norton Rose Fulbright US LLP (57) ABSTRACT

A machine and method for obtaining a curved surface of a film structure that comprises a carrier layer and a functional film (212). The machine comprises an annular support member having a supporting face adapted for supporting the film structure, and an opening (10) that is covered by the film structure when said film structure is supported by the annular support member; a clamping system configured to clamp the annular support member and the film structure when supported by the annular support member; and a forming system configured to apply pressure, and preferably temperature, on the film structure so as to curve said film structure in or through the opening (10) of the annular support member. The opening (10) of the annular support member has a contour that is non-circular so that the (Continued)

obtained curvature of the functional film (212) corresponds to a target curvature.

19 Claims, 5 Drawing Sheets

(58) Field of Classification Search
CPC ......... B29C 51/08; B29C 51/12; B29C 51/16; B29L 2009/00; B29L 2011/00; B29L 2011/0016
See application file for complete search history.

(56) References Cited

U.S. PATENT DOCUMENTS

| | | |
|---|---|---|
| 3,390,482 A | 7/1968 | Holtvoigt |
| 2005/0194719 A1* | 9/2005 | Jordan ................... B29C 51/02 264/322 |
| 2008/0175941 A1 | 7/2008 | Slutsky et al. |
| 2011/0146893 A1* | 6/2011 | Marty ................... B29C 51/10 156/212 |
| 2016/0121540 A1 | 5/2016 | Deneire |

FOREIGN PATENT DOCUMENTS

| | | | |
|---|---|---|---|
| EP | 3587093 | 1/2020 | |
| EP | 3587093 A1 * | 1/2020 | ........... B29C 51/008 |
| WO | WO 2012/170015 | 12/2012 | |
| WO | WO 2020/002606 | 1/2020 | |

OTHER PUBLICATIONS

International Search Report in corresponding PCT Application No. PCT/EP2021/069413, mailed Oct. 10, 2021.

* cited by examiner

Fig. 1
STATE OF THE ART

Fig. 1A
STATE OF THE ART

MACHINE AND METHOD FOR OBTAINING A CURVED SURFACE FOR A FILM STRUCTURE

CROSS-REFERENCE TO RELATED APPLICATIONS

This application is a national phase application under 35 U.S.C. § 371 of International Application No. PCT/EP2021/069413 filed 13 Jul. 2021, which claims priority to European Patent Application No. 20305820.1 filed 16 Jul. 2020. The entire contents of each of the above-referenced disclosures is specifically incorporated by reference herein without disclaimer.

TECHNICAL FIELD

The disclosure relates to the field of optical devices. The disclosure concerns more specifically a machine and method for obtaining a curved surface for a film structure comprising a functional film intended to be laminated on a receiving face of an optical article. The disclosure further concerns an optical device that comprises an optical article provided with a functional film.

DISCUSSION OF THE BACKGROUND

Optical articles, such as ophthalmic lens, involve the behavior and properties of light, such as, for example, of visible light. An optical article comprises at least one optical surface and the light path results from interactions of the light with at least said optical surface.

For enhancing the performance of an optical article, it is known to provide a functional film on a receiving surface of the optical article. The functional film may modify the optical, transmission or mechanical properties of the optical article. For instance, the functional film may provide a polarization or tinting filter, a hard-coat function, an anti-reflective function, a protective coat and a surface quality function.

The functional film is intended to be laminated on the receiving surface of the optical article. Before the lamination step, the functional film needs to be shaped with a curvature that complies with the curvature of the receiving surface of the optical article.

To this end it is known to place the functional film on a plastic carrier layer, for example a polyethylene terephthalate (PET) layer, to form a film structure. During forming, the film layer and carrier are clamped between an annular support member and a clamping member to maintain the film while pressure and temperature are applied on the face of the carrier opposed to the functional film to inflate the carrier layer that pushes onto the functional film for forming a curved functional film in or through the opening of the annular support member.

However, it has been observed that the resulting curvature of the functional film may not be adequate with regard to a targeted curvature.

The purpose of the disclosure is to provide a solution for forming a functional film with a curvature corresponding to a targeted curvature.

SUMMARY it is proposed a machine for obtaining a curved surface of a film structure that comprises a carrier layer and a functional film, the machine comprising:

an annular support member having a supporting face adapted for supporting the film structure, and an opening that is adapted to be covered (closed) by the film structure;

a clamping system configured to clamp the annular support member and the film structure when supported by the annular support member;

a forming system configured to, when said film structure is supported by the annular support member and clamped with said annular support member, apply gaseous pressure, and preferably temperature, on the film structure so as to curve said film structure in or through the opening of the annular support member;

wherein said opening of the annular support member has a contour that is non-circular.

The non-circular contour of the opening of the annular support member enables forming of a curvature of the functional film that corresponds to the target curvature with better reliability and homogeneity than which can be obtained with state of the art support members.

The forming system is configured to apply gaseous pressure. The machine has no punching device that would contact the film structure to deform said film structure. Deformation of the film structure and thus the curved surface is obtained with the forming system, without any contact other than with the clamping system and with the gas used for applying gaseous pressure.

According to a particular aspect, the machine is configured for obtaining a curved surface of a film structure that is sensibly spheric, or pseudo-spherical. In particular, this means that the obtained curved surface of the film structure can be approximated to a spherical surface and have a continuously derivable surface. Further, a mean sphere, or best sphere can be calculated to fit a mean shape of the functional film, and in any point, the surface of the functional film stays within about 4 diopters of the mean sphere, preferably without going farther from the mean sphere than about 3 mm, preferably staying within 2 diopters. (NB, in geometry a diopter is a measurement of curvature equal to the reciprocal of the radius measured in meters)

According to a particular aspect, the machine is configured to apply, with the forming system, a deformation to the film structure that is sensibly isotropic. Although the film structure is heterogenous since the film structure comprises a functional film and a carrier layer that have different flexibilities. Accordingly, the forming system of the invention enables to apply onto the functional film a sensibly isotropic deformation despite the non-isotropic contour of the film, and despite, or more precisely due to the precise control of the non-circular opening of the film support.

According to an embodiment, that film structure is inhomogeneous in term of flexibility along its surface, the presence of the functional film in a central part of it increasing locally the rigidity. According to an embodiment, the functional film has a flexibility that differs from the flexibility of the carrier layer. In a particular variant, the functional film is more flexible than the carrier layer so as to better transfer the deformation imposed by the process and machine.

According to a particular aspect, the machine is configured so that said curved surface of the film structure remains curved even after removing the film structure from the annular support member. The curved surface of the film structure is obtained not just as an intermediate state but it is the resulting step of the activation of the forming system. Thus, the product obtained with the machine, even when removed from the machine, is a film structure having a curved surface, sensibly spherical or pseudo-spherical.

According to a particular aspect, the machine has no mechanical mold or counter-mold against which the film structure may come into contact during activation of the forming system.

Thus, the machine is configured to provide the curved surface of the film structure by plastically deforming the film structure with gaseous pressure, without any mechanical molding device against which the surface of the film structure, and in particular the central part of the surface of the film structure that extend in or though the aperture of the annular support member, would come into contact during activation of the forming system.

Deformation of the film structure is thus obtained without mechanical contact of the part of the film structure that extends in or though the opening of the annular support member. In other words, there is no mechanical tool that would be used as a mold or counter-mold to push onto the film structure.

According to a particular aspect, said non-circular contour has a first defining axis and a second defining axis, along which the opening is shorter than along the first defining axis.

Preferably, at least one or each of said first defining axis and said second defining axis is an axis of symmetry for said opening.

According to a particular aspect, the shape of the non-circular contour of the opening of said annular support member is defined as a function of the shape of the contour of the functional film of the film structure.

According to a particular aspect, wherein the non-circular contour of the opening of said annular support member has a rounded corner rectangular shape or an oval shape.

According to a particular aspect, the functional film is centered in the opening and has two axes of symmetry including a minor axis corresponding to a minor axis of the opening and a major axis corresponding to a major axis of the opening, and
 a film opening ratio, noted R, having a value included in the range [0.7-1.5], R being defined as:

$R=Ps*(Rs-Ps)/[PL*(RL-PL)]$, with
PS the length of the functional film along the minor axis of the opening,
RS the length of the opening along the minor axis of the opening,
PL the length of the functional film along the major axis of the opening,
RL the length of the opening along the major axis of the opening.

According to a particular aspect, the film-opening ratio R has a value included in the range [0.8-1.05].

According to a particular aspect, the functional film being intended to be centered with the opening of the annular support member, the functional film has the following geometrical features:
 0.7 K<XdX<1.15 K for each point of the contour of the functional film,
  with
  dX the spacing between the functional film and the opening along a normal to the contour of said functional film on said point;
  X being the length of the functional film along said axis normal to said point of the contour of the functional film concerned by dX;

K being a constant.

According to a particular aspect, the supporting face of the annular support member has a grip portion adapted to receive a seal, said grip portion extending around the opening and having an inner contour that is circular.

According to a particular aspect, a distance between the contour of the opening of said annular support member and the inner contour of the grip portion is at least equal to 2 millimeters.

According to a particular aspect, the clamping system comprises a clamping member configured to apply a pressure force onto the annular support member and the film structure when supported by the annular support member, so as to define a chamber between said clamping member and said film structure.

It is further proposed a method for obtaining a curved surface of a film structure that comprises a carrier layer and a functional film, wherein the method comprises the following steps:
 providing an annular support member whose opening has a contour that is non-circular;
 positioning the film structure on a supporting face of the annular support member so as to cover the opening of said annular support member by the film structure;
 clamping the film structure between said annular support member and a clamping member;
 forming the film structure by applying a gaseous pressure difference on the film structure to curve said film structure through the opening of the annular support member.

According to a particular aspect, the functional film has a flexibility that differs from the flexibility of the carrier layer. The film structure is inhomogeneous in properties along its whole surface, in particular due to the functional film being smaller than the opening of the support member. Gaseous pressure is applied in a sensibly isotropic way and the shape of the annular support member enables to obtain a sensibly isotropic deformation of the film structure, and in particular of the functional film, although the film structure is inhomogeneous.

According to a particular aspect, there is a free space beyond the annular support member, on a side of the annular support member that is opposite to the forming system, said free space having a height that is greater than the target, or obtained, maximum radius of the curvature of the surface of the film structure.

According to a particular aspect, the size of the functional film is smaller than the size of the opening.

According to a particular aspect, the film structure further comprising a counter-force liner, said functional film being in between said carrier layer and said counter-force liner, the counter-force liner being fastened, directly or indirectly, to the carrier layer at least on a portion of a zone outside the functional film on at least two opposite sides of the functional film,
 after forming the functional film, the counter-force liner is detached from the functional film and from the carrier layer.

According to a particular aspect, after forming the functional film, the functional film is further laminated on a surface of an optical article.

According to a particular aspect, after the forming step and before the laminating step, the largest radius of curvature of the functional film is smaller than the smallest radius of curvature of the receiving surface of the optical article.

LIST OF FIGURES

For a more complete understanding of the description provided herein and the advantages thereof, reference is now made to the brief descriptions below, taken in connection with the accompanying drawings and detailed description, wherein like reference numerals represent like parts.

DETAILED DESCRIPTION

Elements in the figures are illustrated for simplicity and clarity and have not necessarily been drawn to scale. For example, the dimensions of some of the elements in the figure may be exaggerated relative to other elements to help improve the understanding of the embodiments.

With reference to FIGS. 2 to 7, it is proposed a machine and a method for obtaining a curved surface for a film structure 2, thanks to the use of an annular support member 1 against which the film structure 2 is intended to be clamped for being formed.

As described below the annular support member 1 is configured to enable the film structure 2, and in particular the functional film 212, to be shaped with a given curvature, with better reliability and homogeneity than what can be obtained with an annular support member of the state of the art.

Film Structure

According to embodiments, the film structure 2 comprises a carrier layer 20 and a functional film 212.

The film structure 2 may also be referred to as a "multi-layered film" or a consumable stack. The term "stack" refers to the stack of layers that form said film structure 2, while the term "consumable" refers to the fact that at least a part of said film structure 2, that comprises a functional film, is intended to be laminated on a surface of an optical article. The thickness of the film structure 2 may be in the range of 150 to 1500 µm.

In the following description, the optical article is an ophthalmic lens. In other embodiments, the optical article may be other ophthalmic elements and devices. Non-limiting examples of ophthalmic elements include corrective and non-corrective lenses, including single vision or multi-vision lenses, which may be either segmented or non-segmented, as well as other elements used to correct, protect, or enhance vision, magnifying lenses and protective lenses or visors such as found in spectacles, glasses, goggles and helmets. The optical article is preferably a lens, and more preferably an ophthalmic lens.

The carrier layer 20 can be made of a composition comprising polyethylene terephthalate (PET). The thickness of the carrier layer 20 may be in the range of 50 to 500 µm. Alternatively, it can be in Cellulose tri-acetate or (TAC) or polyester (PE), or similar thermoplastic polymeric materials.

The functional film 212 can also be referred to as a "patch". The functional film can be one layer or can be formed of a stack of layers. In the illustrated embodiments and as visible in particular at FIGS. 5 to 6, the functional film 212 has a short axis A212s along which the functional film 212 has a length $P_S$, and a long axis A212L along which the functional film 212 has a length $P_L$. According to embodiments, the functional film comprises at least a functional thermoplastic film.

The functional film may modify the optical, transmission or mechanical properties of the optical article. For instance, the functional film may provide any of a polarization, a tint, or a tinting filter, a hard-coat function, an anti-reflective function, a protective coat and/or a surface quality function or a combination thereof.

The functional film 212 comprises preferably a thermoplastic plastic film with a haze value of preferably no greater than 0.4%, the functional film as a whole having a haze value of preferably no greater than 0.4% once removed from both the carrier and the counter-force liner and from any protective film destined to be removed once the functional film is present and fixed onto the optical article.

Haze value is measured by light transmission measurement using the Haze-Guard Plus© haze meter from BYK-Gardner (a color difference meter) according to the method of ASTM D1003-00, which is incorporated herein in its entirety by reference. All references to "haze" values in this application are by this standard. The instrument is first calibrated according to the manufacturer's instructions. Next, the sample is placed on the transmission light beam of the pre-calibrated meter and the haze value is recorded from three different specimen locations and averaged.

The thickness of the functional film 212 may be in the range of 10-500 µm. The functional film 212 can be made of a composition comprising polyethylene terephthalate (PET), and/or polycarbonate and/or cellulose triacetate (TAC, for triacetate cellulose, in French) that may be coated with a hard coat (HC) or an antireflective (AR) coating.

Further, the functional film 212 may generally comprise further layers that enable some of the functions above-mentioned.

Figure 3:
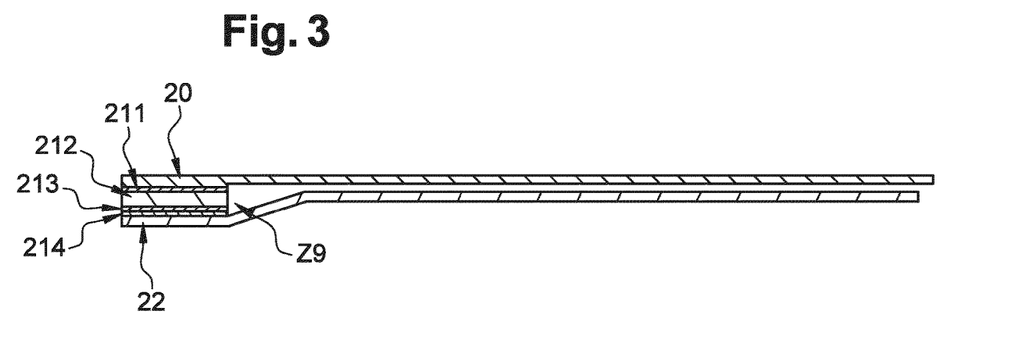
FIG. 3 is a half part of a cross-sectional schematic view of a film structure according to an embodiment of the invention.

With reference to FIG. 3, and according to a particular aspect, the film structure 2 can comprise a counter-force liner 22 so that the functional film may be sandwiched, directly or indirectly, between the carrier layer and the counter-force liner. The size of the carrier layer and/or the counterforce liner is greater than the size of the opening of the annular support member, to enable clamping of the film structure onto the annular support member while having the functional film spaced from and surrounded by the non-circular contour 11 of the opening 10 in a top view.

The counter-force liner 22 can be made of a composition comprising polyethylene terephthalate (PET) or polyester (PE). The thickness may be in the range of 50-500 μm. According to a particular aspect the counter-force liner 22 comprises silicone, in particular on its side that faces the carrier layer. The counter force liner may be a PPI Adhesive Product sold under reference PPI 0601 (0.075 mm) SILI-CONISED POLYESTER FILM.

The area of the counter-force liner can be superior to the one of the carrier layer. According to an embodiment, the counter-force liner is more flexible than the carrier layer.

The functional film has an area that is smaller than the one of the carrier layer and than the one of the counter-force liner. During a forming step that forms the carrier layer and the functional film into a curved shape, the counter-force liner maintains the functional film on the carrier, in contact with said carrier on the whole surface of the functional film, preventing the detachment of part of the functional film from said carrier layer.

Figure 3A:
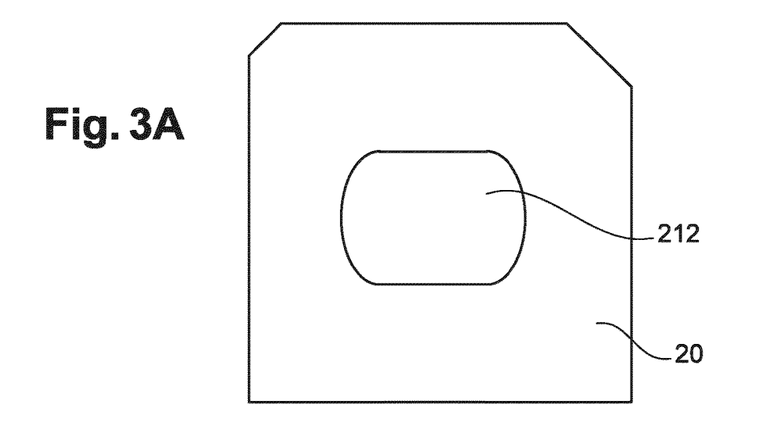
FIG. 3A is a top view of a functional film and a carrier layer of a film structure according to an embodiment of the invention.

In particular and as illustrated at FIGS. 3 and 3A, the perimeter of the functional film layer 212 is inscribed inside, and thus surrounded by, the perimeter of the carrier layer 20 and by the perimeter of the counter-force liner 22. This, in particular, enables to hold, fix or clamp, the carrier layer 20 to a machine or device without clamping, polluting, soiling, fouling, damaging or applying stress onto the functional film.

According to various embodiments, other intermediate layer(s) can be positioned between, on the one hand, the functional film 212 and, on the other hand, the carrier layer 20 and/or the counter-force liner 22. According to a particular aspect, the carrier layer 20 and the counter-force liner 22 are also larger in at least one dimension than said intermediate layer(s).

According to various embodiments, in a plan view, the carrier layer 20 and the counter-force liner 22 extend all around the stack of intermediate layers that comprises at least the functional film, and are thus larger than the functional film in both dimensions of said plan view. Preferably, in a plan view, such stack of intermediate layers is positioned in the central region of the carrier layer 20 and of the counter-force liner 22. The counter-force liner 22 and the carrier layer 20 are sensibly of the same dimensions and overlap each other to sandwich the functional film or the corresponding stack of intermediate layers. The area of the counter-force liner 22 is preferably slightly larger to the one of the carrier layer 20 to take into account the thickness of the functional film, or of the stack of intermediate layers, that may be overlapped by said counter-force liner 22. Indeed, a small step is thus formed by the functional film, and while the carrier layer 20 is mostly flat, before the forming step, the counter-force liner 22 is such that its shape allows for said small step.

A carrier-side sliding layer 211 may be positioned in between the carrier layer 20 and the functional film 212. Said carrier-side sliding layer 211 is adapted to enable a positioning float of the functional film 212 with regard to the carrier layer 20, in particular during any potential deformation of the carrier layer. Said in other words, the carrier-side sliding layer 211 is adapted so as to reduce a radial stress that would be imposed on the functional film 212 if it were to be too strongly fixed to the carrier layer 20 during deformations of such carrier layer. It is considered that during the forming step there is a point of maximum elevation from the initial plan. The radial stress mentioned above would be estimated to extend substantially radially from said point of maximum elevation.

The thickness of the carrier-side sliding layer 211 may be in the range of 10-500 μm.

According to an embodiment, the carrier-side sliding layer 211 may comprise a double coated tape provided by company 3M under product reference 9088 (or also referred as "High Performance Double Coated Tape 9088 with adhesive 375").

According to another embodiment, the carrier-side sliding layer 211 may comprise an acrylic adhesive layer. The carrier-side sliding layer may have an overall-light transmissivity of 90% or more, in the 400-780 nm wavelength range, and/or a Haze value of 1.0 or less. The carrier-side sliding layer may have dry and wet adhesion properties of 25 N/25 mm or more, according to a testing method using:
  tensile meter
  substrate of polycarbonate plate with corona treatment, peeling angle of 90° and
  peeling speed: 25 mm/min
  backing material: Polyethylene terephthalate film with corona treatment
  laminating condition onto polycarbonate plate: one round trip with a 2 kg roller.

The acrylic adhesive layer can be sandwiched between two PET release liners. One of the PET release liners may have a peelability of 0.2 N/50 mm or less, and the other PET release liners may have a peelability of 1.0 N/50 mm or less, according to a testing method using a tensile tester, a peeling speed of 0.3 m/min and a peeling angle of 180°.

A liner-side sliding layer 214 may be positioned in contact with the counter-force liner 22 or with a layer fastened to the counter-force liner 22. The liner-side sliding layer 214 enables a positioning float of the functional film 212 with regard to the counter-force liner 22. Said in other words, the liner-side sliding layer 214 is adapted so as to reduce a radial stress that would be imposed on the functional film 212 if it were to be too strongly fixed to the counter-force liner 22. It is considered that during the forming step there is a point of maximum elevation from the initial plan. The radial stress mentioned above would be estimated to extend substantially radially from said point of maximum elevation.

The liner-side sliding layer 214 can be made of a composition comprising polyethylene (PET). Alternatively, the liner-side sliding layer 214 may be made of a composition identical or similar to the one of the carrier-side sliding layer 211 proposed above. Alternatively, the carrier or liner side sliding layer, may be a pressure sensitive adhesive (PSA) for instance according to PCT—Application No WO2017168192 filed on Mar. 29, 2016, included herein by reference. Said PSA further has the property of being an optical grade material with a haze value of preferably no greater than 0.4%.

The liner-side sliding layer 214 may comprise a layer of silicone on one or both sides. The thickness of the liner-side sliding layer 214 may be in the range of 10-100 μm. In particular, the counter-force liner 22 may comprise, at least on an area in contact with the liner-side sliding layer 214 a layer of silicone.

As illustrated in the embodiment of FIG. 3, the film structure 2 may also include an adhesive layer 213, such as a Pressure Sensitive Adhesive (also referred as PSA) layers, in between the functional film 212 and the liner-side sliding layer 214. The adhesive layer 213 may be made of a composition identical or similar to the one of the carrier-side sliding layer 211 or the liner-side sliding layer 214 proposed above.

The adhesive layer 213 may be part of the liner-side sliding layer 214. For example, the adhesive layer 213 may be in direct contact with the counter-force liner 22, modulo a possible layer of silicone or other antisticking layer.

During thermoforming, a difference of pressure can be applied so as to inflate the carrier layer 20 towards the counter-force liner 22. The counter-force liner 22 is flexible enough to be deformed along the carrier layer 20. The device may also be used in cases where a difference of pressure is applied so as to inflate the counter-force liner 22 in a direction towards the carrier layer 20. In that second case, the benefits of the counter-force liner 22, which is supposed to be removed before a lamination of the functional film on an optical article, are mainly to act as a protection from dirt and dust pollution during forming, or to maintain a surface aspect of an adhesive layer 213 which may otherwise change during thermoforming.

In particular the counter-force liner 22 is configured to be deformed when positive pressure is applied on the face of the carrier layer 20 opposed to the counter-force liner 22.

When being inflated because of the pressure applied on the carrier layer 20, the counter-force liner 22 applies a counter-force to the functional film 212, on sensibly the whole area of said functional film 212. Thus, delamination of some of the edges of the functional film 212 is limited or even prevented.

After forming and, possibly also before, the counter-force liner 22 may be in contact with the carrier layer 20 for substantially each zone of the counter-force liner 22 which is not in contact with the functional film 212 or which is not facing the receiving area. According to embodiments, fastening between the carrier layer 20 towards the counter-force liner 22 is done essentially all around the receiving zone which comprises the functional film 212.

Pressure applied to the carrier layer can be positive pressure applied to the carrier layer or more generally a positive difference of pressure between a side of the film structure 2 comprising the carrier layer 20 and a side of the film structure 2 comprising the counter-force liner 22.

Embodiments of a film structure, its thermoforming and/or application on a lens, can be found in PCT-application No WO2020/002606 A1 filed on Jun. 28, 2019, the entire content of which is incorporated in its entirety herein by reference.

Annular Support Member

Figure 2:
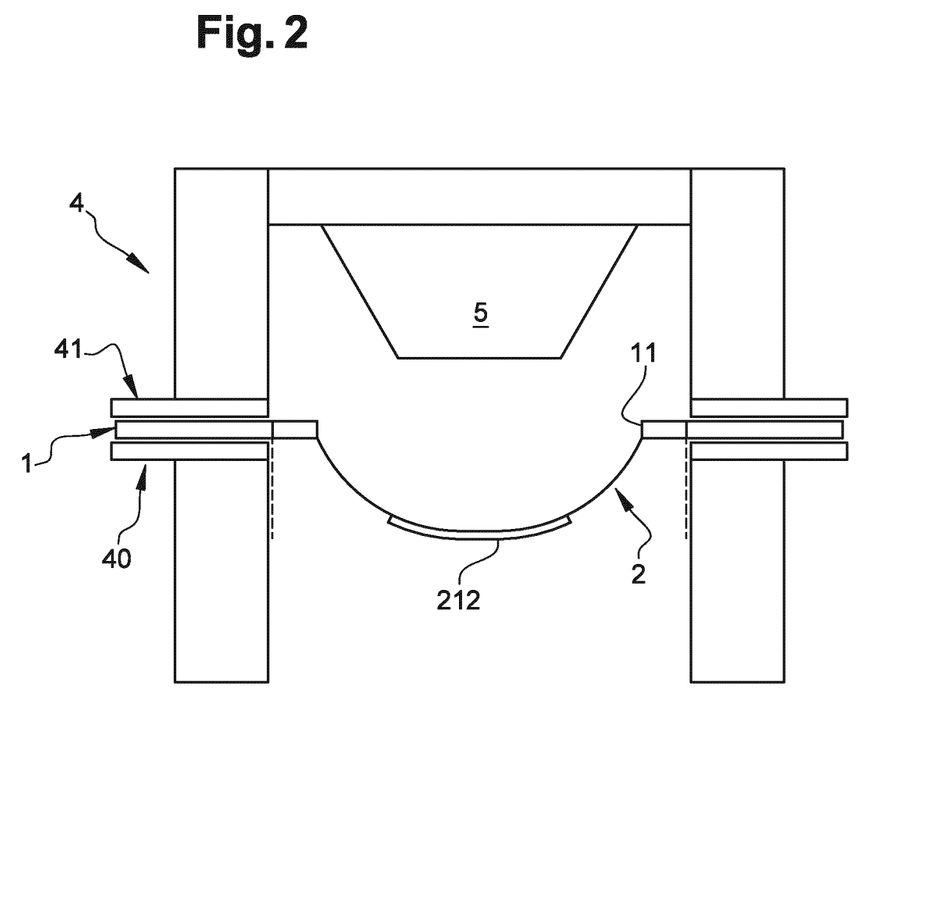
FIG. 2 is a cross-sectional schematic view of an annular support member and of a film structure clamped against the annular support member and thermoformed according to an embodiment of the invention, the cross section being executed along a minor axis of the opening of the annular support member corresponding to a minor axis of the functional film.
Figure 2A:
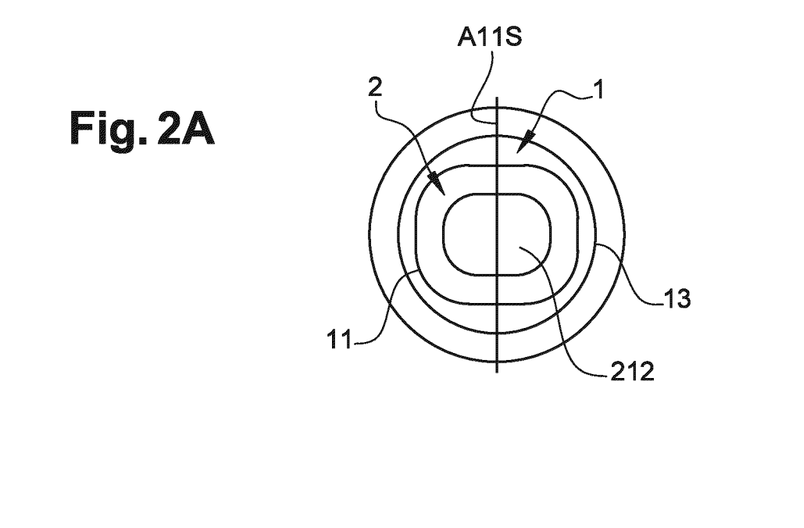
FIG. 2A is a top schematic view of the film structure and of the annular support member of FIG. 2.
Figure 4:
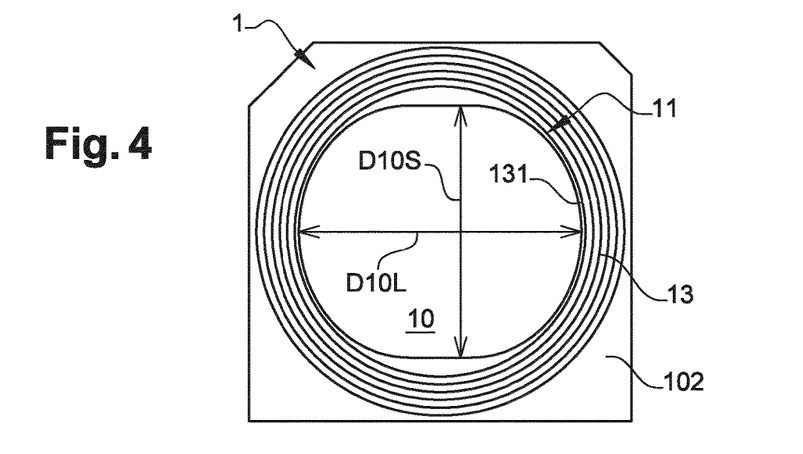
FIG. 4 is a top view of an annular support member according to an embodiment of the invention.
Figure 5:
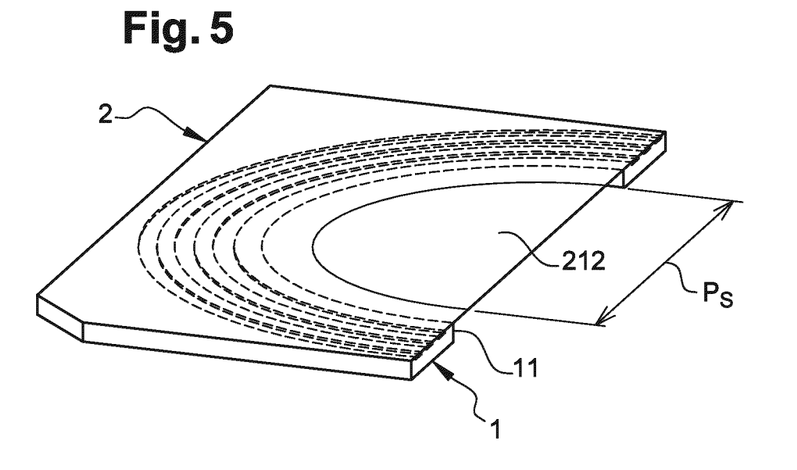
FIG. 5 is a perspective view of a half cut of the assembly of a film structure and of an annular support member according to an embodiment of the invention, before the forming of the film structure, the cut being executed along a minor axis of the film structure that also corresponds to a minor axis of the opening of the annular support member.
Figure 5A:
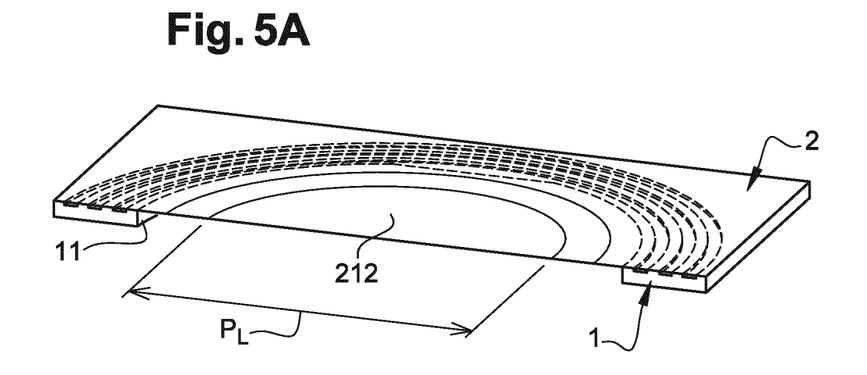
FIG. 5A is a perspective view of a half cut of the assembly of a film structure and of an annular support member according to an embodiment of the invention, before the forming of the film structure, the cut being executed along a major axis of the film structure that also corresponds to a major axis of the opening of the annular support member.
Figure 5B:
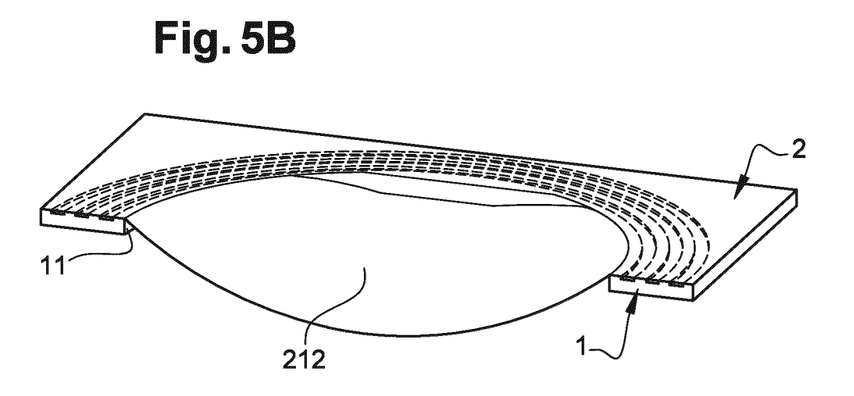
FIG. 5B is a view of the half cut of the film structure and of the annular support member of FIG. 5A after the forming of the film structure.
Figure 6:
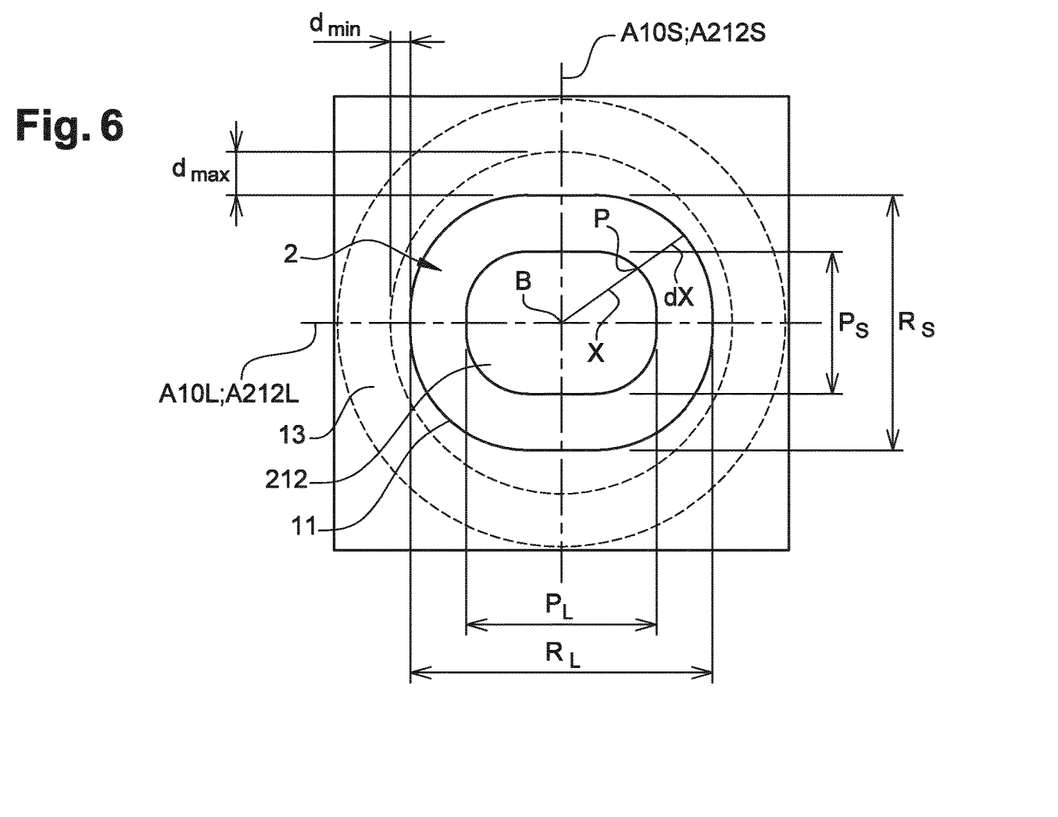
FIG. 6 is a schematic top view of the assembly of a film structure and of an annular support member according to an embodiment of the invention.

As illustrated more particularly at FIGS. 2, 4 and 6, the machine comprises an annular support member 1.

The annular support member 1 has a supporting face 102 adapted for supporting the film structure 2. According to a particular aspect, this is the carrier layer 20 of the film structure 2 that is intended to be in contact with the supporting surface 102 of the annular support member 1.

The annular support member 1 presents an opening 10 that is covered by the film structure 2 when said film structure 2 is supported by the annular support member 1.

According to a particular aspect, the supporting face 102 of the annular support member 1 has a grip portion 13 adapted to receive a seal. The grip portion 13 extends around the opening 10 and has an inner contour 131 that is circular. Alternatively, the inner contour may be a square or a rectangle or any other shape.

According to embodiments, the minimum distance, noted dmin at FIG. 6, between the contour 11 of the opening 10 of the annular support member 1 and the inner contour 131 of the grip portion 13 is at least equal to 0.5 millimeters. The maximum distance, noted dmax at FIG. 6, between the contour 11 of the opening 10 of the annular support member 1 and the inner contour 131 of the grip portion 13 is at least equal to 50 millimeters.

As can be observed in particular at FIG. 4 and FIG. 6, the opening of the annular support member 1 has a contour 11 that is non-circular.

According to embodiments and as illustrated at FIGS. 4 and 6, in plan view, the non-circular contour 11 of the opening 10 has a first defining axis A10L, also referred to as a major axis, along which the opening 10 has a length D10L, and a second defining axis A10S, also referred to as a minor axis, along which the opening 10 has a length D10S along which the opening is shorter than along the first defining axis A10L.

According to a particular aspect, each of said first defining axis A10L and said second defining axis A10S is an axis of symmetry for said opening 10.

The shape of the non-circular contour 11 of the opening 10 of said annular support member 1 is defined in function of the shape of the contour of the functional film 212.

In particular, the shape of the functional film 212 is included in the shape of the non-circular contour 11 of the opening 10 of said annular support member 1. In other words, and as illustrated at FIG. 6, the surface of the functional film 212 is smaller than the surface of the opening 10 of said annular support member 1, while the surface of the film structure 2 is larger than the opening, to be supported by the annular support member 1.

The shape of the non-circular contour 11 of the opening 10 of said annular support member 1 can be similar or identical to the shape of the functional film 212, the size of the functional film 212 being smaller than the size of the opening 10. Preferably the functional film 212 and the opening 10 of said annular support member 1 have similar or identical orientation so that their axes are combined when the functional film 212 is positioned onto the opening 10 of said annular support member 10.

By similar to the shape of the functional film it is meant that it has an equivalent arrangement of symmetric axis, and angle between them, and similar relative position of barycenter. In particular it is further of the same family of shapes and in particular, the shape is close to identical, modulo a factor of scale and possible changes in curvature radius at some parts.

The annular support member may be a support with adjustable portions, enabling to modulate the great axis length or the smaller axis length, or even enable to form different shapes than an ovoid or an elongated circle such as a triangle with rounded angles. Such adjustable annular support member may enable to form a curvature of the functional film that may be closer to that of the surface of the corresponding optical lens.

Dimensional Relationship Between the Annular Support Member and the Functional Film As illustrated in particular at FIG. 6, the functional film 212 is centered in the opening 10 of the annular support member 1 and has two axis of symmetry including a minor axis A212S corresponding to a minor axis A10S of the opening 10 and a major axis A212L corresponding to a major axis A10L of the opening 10.

A film opening ratio, noted R, is defined as follows:

$$R=Ps*(Rs-Ps)/[PL*(RL-PL)],$$

with Ps the length of the functional film 212 along the minor axis A10S of the opening 10, Rs the length of the opening 10 along the minor axis A10S of the opening, $P_L$ the length of the functional film 212 along the major axis A10L of the opening, $R_L$ the length of the opening 10 along the major axis A10L of the opening.

According to a particular embodiment, the film opening ratio, noted R, has a value included in the range [0.7-1.5]. According to other embodiments, the film-opening ratio R has a value included in the range [0.8-1.05].

According to embodiments the functional film 212 is to be centered in the opening 10. A geometrical feature of the functional film 212 is preferably as follows:

0.7 K<XdX<1.15 K for each point of the contour of the functional film 212, with, for a given point P of the contour of the functional film 212:

X being the distance between the barycenter B of the functional film 212 and said point P of the contour of the functional film 212;

dX: the distance between said point P of the functional film 212 and the contour of the opening 10 of the annular support member, said distance being considered along an axis that passes through points B and C; and K being a constant.

In the illustrated embodiments, the non-circular contour 11 of the opening 10 of said annular support member 1 has a rounded corner rectangular. The non-circular contour 11 may also have an oval shape. More generally, in plan view, the contour 11 is smooth, i.e. curved and without angles.

Clamping System

As illustrated more particularly at FIG. 6, the machine for forming the film structure 2 comprises a clamping system 4 configured to clamp the annular support member 1 and the film structure 2 when said film structure 2 is supported by the annular support member 1.

The clamping system 4 comprises an annular base 40 that receives the annular support member 1 and a clamping member 41 configured to apply a pressure force onto the annular support member 1 and the film structure 2 supported by the annular support member 1.

The clamping member 41 can be moved between an open position wherein the film structure 2 can be introduced upon the annular support member 1 in view of being thermoformed, or extracted once being thermoformed, and a closed position wherein the film structure 2 is clamped against the annular support member 1 in a clamping zone of the film structure 2, outside the functional film 212. Said clamping zone preferably corresponds to the grip zone 13 of the annular support member 1.

In the closed position of the clamping member 41, the film structure 2, obstructs the opening of the annular support member 1.

A chamber is thus defined between said clamping system 4, by the clamping member 41, when in the closed position, and the film structure 2, to enable application of pressure and preferably temperature to the film structure 2 so as to form the film with a curvature in or through the opening of the annular support member 1.

Thermoforming System

The machine further comprises a thermoforming system 5, also referred as to a heating and pressurizing system. When the film structure 2 is supported by the annular support member 1 and clamped with said annular support member 1 via the clamping system 4, the thermoforming system 5 can be used to apply temperature and pressure on the film structure 2 so as to form said film structure 2 with a curvature, in particular the functional film 212, through the opening 10 of the annular support member 1.

The thermoforming system 5 is adapted to heat the carrier layer, and the functional film to a temperature of about 100° C. to 140° C., for example about 120° C. to about 130° C. during the thermoforming step. The temperature for thermoforming may also be between 80° C.-140° C., for example 100° C.-130° C., for example 115° C. to 125° C., or about 120° C. Concurrently the machine is adapted to provide a positive pressure to the carrier side during the thermoforming. Said pressure may rise to about 2 or 3 bar. The machine may further have a controlling system for increasing the temperature and/or the pressure, with a chosen rate, with or without pauses in said increase, until a predetermined time or a predetermined deformation or curvature of the carrier layer or of the counter-force liner is reached.

Temperature and pressure are applied on the film structure 2 so as to obtain a desired curveted surface. In other words, the resulting curved film structure has, in at least one axial cutting plane of the curved film structure, a radius corresponding to a target radius or curvature.

The non-circular contour of the opening of the annular support member 1 enables to obtain a curvature of the functional film 212 that corresponds to the target curvature with better reliability and homogeneity than what can be obtained with an annular support member of the state of the art.

Figure 1:
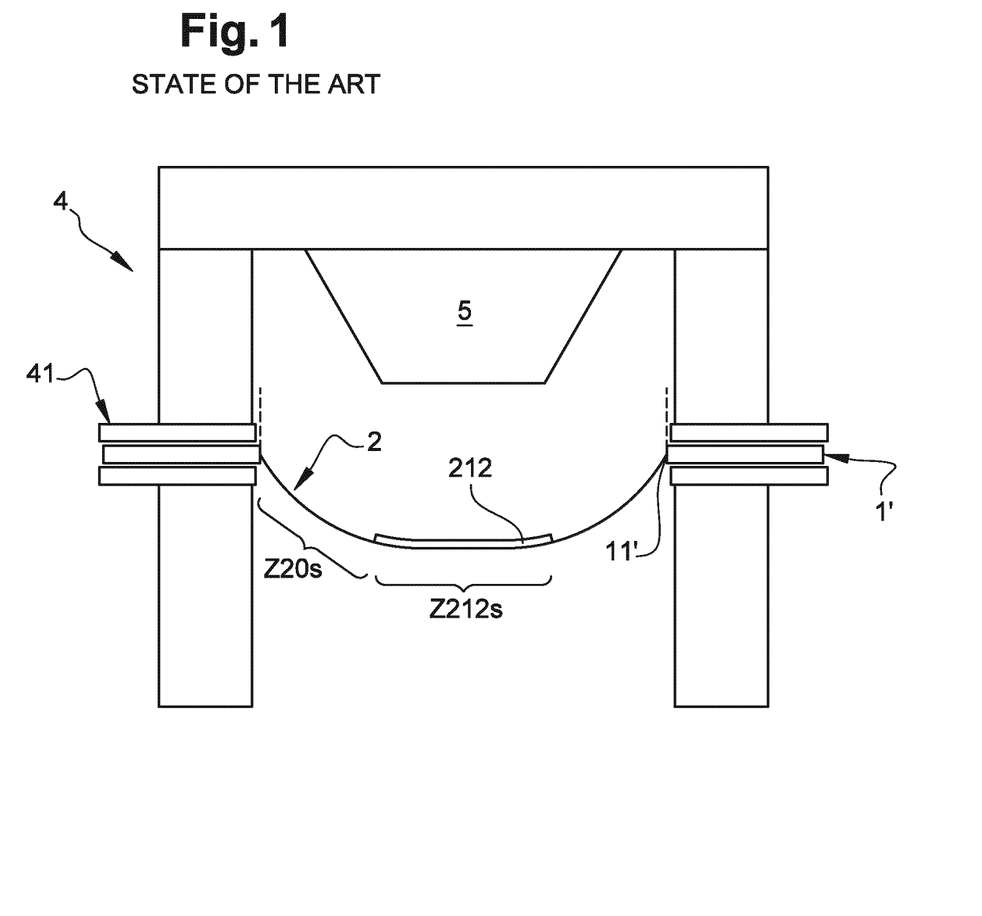
FIG. 1 is a cross-sectional schematic view of an annular support member and of a film structure that is clamped against the annular support member and thermoformed, according to an example of the state of the art, the cross section being executed along a minor axis of the functional film.
Figure 1A:
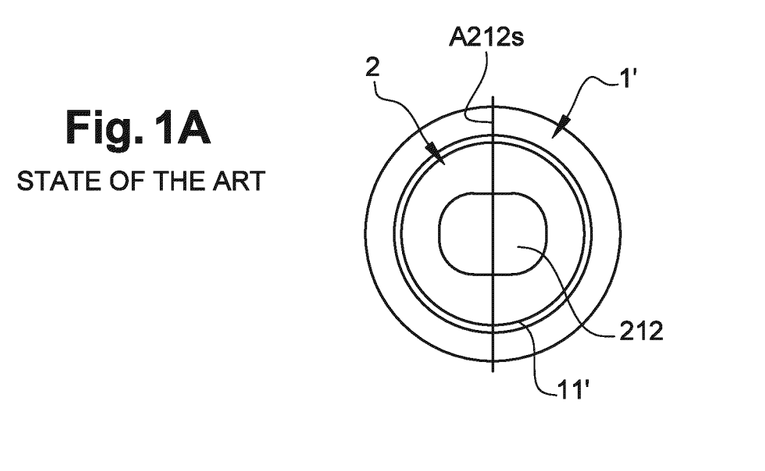
FIG. 1A is a top schematic view of the film structure and of the annular support member of FIG. 1.

On the contrary, the schematic illustration in FIG. 1 illustrates that, when an annular support member 1' that has an internal contour 11' defining a circular opening as in the state of the art, is used to support the film structure 2 during the forming process, it can be observed that the region Z212s of the functional film 212 of the film structure 2 presents along the minor axis A212S low deformation compared to the region Z20S of the carrier layer 20 of the film structure 2 (around the functional film 212) that presents higher deformation. As a consequence, the curvature of the functional film 212 that is obtained along the minor axis A212s is lower than the target curvature.

Method

Figure 7:
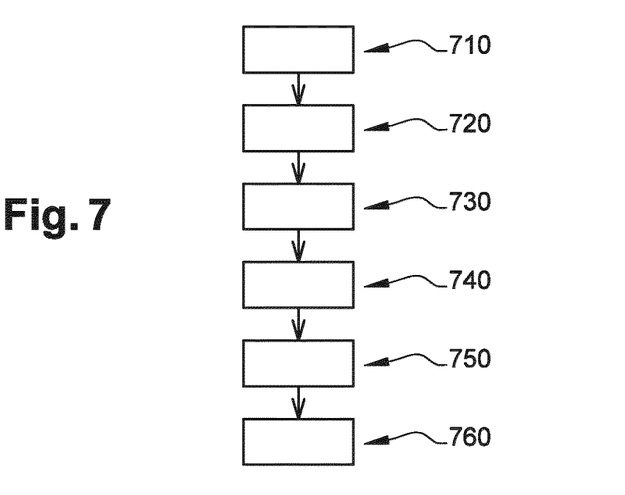
FIG. 7 is a diagram showing steps of a method according to an embodiment of the invention.

With reference to FIG. 7, it is proposed a method for obtaining a curved surface of a film structure 2, in particular of a functional film 212, that can be according to any embodiment described above.

At step 710, it is provided an annular support member 1 whose opening 10 has a contour 11 that is non-circular. The annular support member 1 can be according to any embodiment described above.

At step 720, the film structure 2 is positioned on the supporting face 102 of the annular support member 1 so as to cover the opening 10 of said annular support member 1. Preferably the functional film 212 is centered with regard to the opening 10. According to a particular aspect, major axis of the functional film 212 and major axis of the opening 10 are combined, and similarly minor axis of the functional film 212 and minor axis of the opening 10 are combined.

At step 730, the film structure 2 is clamped between the annular support member 1 (that is received on an annular base 40) and a clamping member 41 of the clamping system 4.

At step 740, the film structure 2 is formed, preferably thermoformed, to curve said film structure 2, and in particular the functional film 212, in or through the opening 10 of the annular support member 1. According to a particular embodiment, the (thermo)forming system applies a pressure, and preferably a temperature by heating, on the carrier layer 20 so as to inflate the carrier layer 20 towards the counter-force liner 22 when it is presents, the counter-force liner 22 applying a counter-force to the functional film 212.

Then it is possible to obtain an optical device by providing at step 750 an optical article and laminating 760 the functional film 212 on the optical article. Potentially the laminating step is done on another module or machine than the module or machine used to thermoform the film structure 2.

According to a particular embodiment, after forming of the film structure 2, the counter-force liner 22 is removed from the film structure 2, thus making apparent the functional film 212, and if present the adhesive layer 213 and/or the liner-side sliding layer 214. The functional film layer 212 can be arranged via said adhesive layer 213 and/or said liner-side sliding layer 214 on the receiving surface of the optical article. In an embodiment present, the liner-side sliding layer 214 may be removed after forming in view of the laminating step.

According to particular aspect, the functional film 212 can be attached to the optical article by means of an adhesive layer added to the optical article that can be independent of the film structure 2, or that can be a layer of said film structure, such as said adhesive layer 213, or the liner-side sliding layer. Said adhesive layer is most preferentially an optical grade adhesive layer, and preferentially a PSA. In an embodiment, said adhesive layer is the liner-side sliding layer and is an optical grade PSA.

In a particular embodiment, a laminating machine is used in order to enable a lamination of the functional film, born by the carrier layer, onto an optical article. Said laminating machine has mobile elements adapted for approaching the thermoformed functional film toward the optical article and/or for approaching the optical article toward the thermoformed functional film. Thereafter the functional film is brought in contact with the optical article. In a particular embodiment the thermoformed functional film, fixed onto the carrier layer presents a convex shape and is brought in contact with a concave face of the optical article.

In an embodiment a positive pressure is applied from the side of the carrier so as to push the functional film onto the face of the optical article.

The pressure applied may reach 2 or 3 bar.

The pressuring step may be done with a temperature applied onto the film of about 25 to 80° C. The temperature for thermoforming may also be between 80° C.-140° C., for example 100° C.-130° C., for example 115° C. to 125° C., or about 120° C.

The pressure may be maintained during a duration comprised between seconds and 10 minutes. This enables to ensure that the adhesive layer is correctly adhering the functional film onto the optical article.

Thereafter, a cooling step may be applied in some embodiments.

Eventually, the carrier layer is removed from the functional film. If present the carrier-side sliding layer is also removed.

Further to these last steps, an optical article comprising a film fixed on one of its surfaces is obtained, with no or reduced defects in particular thanks to the curvature of the functional film obtained after forming using the annular support member.

In a particular embodiment, the laminating machine is the thermoforming machine. In a further example the carrier layer is clamped in the same clamping system during both the thermoforming and the lamination. The carrier layer may possibly be declamped so as to remove the counter force liner. In such machine a cooling step may be applied between the thermoforming and the lamination.

According to a particular embodiment, the silicone that may be present on the carrier layer and/or the counter-force liner may be a silicone provided by company Siliconature under product reference SILPHAN S50.

According to various embodiments, the carrier side of the counter-force liner may be in contact directly with the functional film or one of the layers on top of the functional film which are intended to be present on the optical article and intended to bring a function to the optical article.

According to particular embodiment and to enhance the result of the laminating step, the target curvature of the film structure can be chosen so that the largest radius of curvature of the functional film 212 is smaller than the smallest radius of curvature of the receiving surface of the optical article.

To prevent the presence of gas trapped at the vicinity of the functional film 212 between layers of the film structure 2, a gas venting system can be provided for enabling gas that is present in the vicinity of the functional film 212 in the film structure 2 to exhaust at least partially out of said film structure 2. Example embodiments of gas venting system can be found in PCT-application No WO2020/002606 A1 filed on Jun. 28, 2019, the entire content of which is incorporated in its entirety herein by reference.

According to a particular embodiment, the machine is configured to apply, with the forming system, a deformation to the film structure that is sensibly isotropic.

According to a particular embodiment, the machine is configured so that the curved surface of the film structure 2 remains curved even after removing the film structure 2 from the annular support member 1.

According to a particular embodiment, there is a free space beyond the annular support member, on a side of the annular support member that is opposite to the forming system, said free space having a height that is greater than the target, or obtained, maximum radius of the curvature of the surface of the film structure.

Examples of Experimentations

In the below examples, when it is made reference to an opening of the annular support member that has a size "X"*"Y", this means that X is the length RL of the opening, in millimeters, along the major axis A10L, and that Y is the length RS of the opening in millimeters along the minor axis A10S. Similarly, when it is made reference to a functional film 212 that has a size "Z"*"W", this means that Z is the length PL of the opening, in millimeters, along the major axis A10L, and that Y is the length PS of the opening in millimeters along the minor axis A10S.

Use of an annular support member with an opening of size 90*80 provides goods results for curving a functional film 212 of size 64*45 and for curving a functional film 212 of size 64*53 according to a target curvature of 55 mm Use of an annular support member with an opening of size 90*75 also provides goods results for curving a functional film 212 of size 64*45 according to a target curvature of 55 mm. An annular support member with an opening of size 90*85 can also be used for curving a functional film 212 of size 64*53 according to a target curvature of 55 mm.

On the contrary it has been experienced that circular openings of size 90*90 did not provide acceptable curvature with regard to a target curvature of 55 mm.

The invention claimed is:

1. A machine for obtaining a curved surface of a film structure that comprises a carrier layer and a functional film, the machine comprising:
   an annular support member having a supporting face adapted for supporting the film structure and an opening that is adapted to be covered by the film structure;
   a clamping system configured to clamp the annular support member and the film structure when supported by the annular support member;
   a forming system configured to, when said film structure is supported by the annular support member and clamped with said annular support member, apply gaseous pressure on the film structure so as to curve said film structure in or through the opening of the annular support member such that the gaseous pressure that is applied on the film structure imparts a curved surface to the film structure;
   wherein said opening of the annular support member has a contour that is non-circular.

2. The machine according to claim 1, wherein the machine is configured for obtaining the curved surface of the film structure that is sensibly spheric, or pseudo-spherical.

3. The machine according to claim 1, wherein the machine has no mechanical mold or counter-mold against which the film structure may come into contact during activation of the forming system.

4. The machine according to claim 1, wherein said non-circular contour has a first defining axis and a second defining axis, along which the opening is shorter than along the first defining axis.

5. The machine according to claim 1, wherein the non-circular contour of the opening of said annular support member has a shape that is defined as a function of a shape of a contour of the functional film of the film structure.

6. The machine according to claim 1, wherein the non-circular contour of the opening of said annular support member has a rounded corner rectangular shape or an oval shape.

7. The machine according to claim 1, wherein the functional film is centered in the opening and has two axes including a minor axis corresponding to a minor axis—of the opening and a major axis corresponding to a major axis of the opening, and a film opening ratio, noted R, having a value that ranges from [0.7-1.5], R being defined as:

$$R=P_S*(R_S-P_S)/[P_L*(R_L-P_L)],$$

with
   $P_S$ is a length of the functional film along the minor axis of the opening,
   $R_S$ is a length of the opening along the minor axis of the opening,
   $P_L$ is a length of the functional film along the major axis of the opening, and
   $R_L$ is a length of the opening along the major axis of the opening.

8. The machine according to claim 7, wherein the film-opening ratio R has a value included in the range [0.8-1.05].

9. The machine according to claim 1, wherein the functional film comprises geometrical features, wherein the geometrical features further comprise:
   0.7 K<XdX<1.15 K for each point of a contour of the functional film, with dX being a spacing between the functional film and the opening along an axis normal to the contour of said functional film on said point;
   X being the length of the functional film along said axis normal to said point of the contour of the functional film concerned by dX; and
   K being a constant.

10. The machine according to claim 1, wherein the supporting face—of the annular support member has a grip portion adapted to receive a seal, said grip portion extending around the opening and having an inner contour that is circular.

11. The machine according to claim 10, wherein a distance between the contour of the opening of said annular support member and the inner contour of the grip portion—is at least equal to 2 millimeters.

12. The machine according to claim 1, wherein the clamping system comprises a clamping member configured to apply a pressure force onto the annular support member and the film structure when supported by the annular support member, so as to define a chamber between said clamping member and said film structure.

13. The machine according to claim 1, wherein the forming system is configured to apply temperature on the film structure.

14. A method for obtaining a curved surface of an optical film structure that comprises a carrier layer and a functional film, wherein the method comprises:
   providing an annular support member, with an opening that has a contour that is non-circular;
   positioning the optical film structure on a supporting face of the annular support member so as to cover the opening of said annular support member by the optical film structure;
   clamping the optical film structure between said annular support member and a clamping member; and
   forming the optical film structure by applying a gaseous pressure on the optical film structure to curve said optical film structure through the opening of the annular support member such that the gaseous pressure that is applied on the optical film structure imparts a curved surface to the optical film structure.

15. The method according to claim 14, wherein the functional film—has a flexibility that differs from the flexibility of the carrier layer.

16. The method according to claim 14, wherein a size of the functional film is smaller than a size of the opening.

17. The method according to claim 14, wherein the film structure further comprises a counter-force liner, said functional film being in between said carrier layer and said counter-force liner, the counter-force liner being fastened, directly or indirectly, to the carrier layer at least on a portion of a zone outside the functional film on at least two opposite sides of the functional film, and wherein after forming the functional film, the counter-force liner is detached from the functional film and from the carrier layer.

18. The method according to claim 14, wherein, after forming the functional film, the functional film is further laminated on a surface of an optical article.

19. The method according to claim 18, wherein, after the forming step and before the laminating step, a largest radius of curvature of the functional film is smaller than a smallest radius of curvature of the receiving surface of the optical article.

\* \* \* \* \*